United States Patent [19]

Aoki et al.

[11] Patent Number: 5,503,911
[45] Date of Patent: Apr. 2, 1996

[54] MAGNETIC RECORDING MEDIUM HAVING A MAGNETIC LAYER CONTAINING HEXAGONAL PLATELET FERRITE PARTICLES AND AN UNERLAYER HAVING A SPECIFIED THICKNESS

[75] Inventors: Nobuyuki Aoki, Hirakata; Yukihiro Shimasaki, Sanda; Akira Kisoda, Moriguchi; Yuji Mido, Higashiosaka; Takumi Haneda, Takatsuki, all of Japan

[73] Assignee: Matsushita Electric Industrial Co., Ltd., Osaka, Japan

[21] Appl. No.: 469,424

[22] Filed: Jun. 6, 1995

Related U.S. Application Data

[63] Continuation of Ser. No. 145,470, Oct. 19, 1993, abandoned, which is a continuation of Ser. No. 822,915, Jan. 21, 1992, abandoned.

[30] Foreign Application Priority Data

Jan. 24, 1991 [JP] Japan ................................ 3-007000

[51] Int. Cl.⁶ ........................................................ G11B 5/00
[52] U.S. Cl. ........................ 428/213; 428/216; 428/329; 428/336; 428/402; 428/689; 428/694 BH; 428/694 BS; 428/900
[58] Field of Search ................................ 428/213, 336, 428/402, 701, 702, 704, 689, 698, 699, 694, 900, 694 BS, 329, 216, 694 BH

[56] References Cited

U.S. PATENT DOCUMENTS

| | | | |
|---|---|---|---|
| 3,846,843 | 11/1974 | Franer | 360/135 |
| 3,959,553 | 5/1976 | Hartmann et al. | 428/329 |
| 4,587,157 | 5/1986 | Brock et al. | 428/216 |
| 4,666,769 | 5/1987 | Miyata et al. | 428/323 |
| 4,746,558 | 5/1988 | Shimozawa et al. | 428/141 |
| 4,963,433 | 10/1990 | Ogawa et al. | 428/323 |
| 5,104,750 | 4/1992 | Kubo et al. | 428/694 |

FOREIGN PATENT DOCUMENTS

| | | |
|---|---|---|
| 50-104003 | 8/1975 | Japan . |
| 57-195329 | 12/1982 | Japan . |
| 59-139132 | 8/1984 | Japan . |

*Primary Examiner*—Stevan A. Resan
*Attorney, Agent, or Firm*—Stevens, Davis, Miller & Mosher

[57] ABSTRACT

A coating film of a double-layer structure for a recording medium is formed by providing a non-magnetic buffer layer just beneath a magnetic recording layer composed of magnetic hexagonal platelet ferrite particles, wherein the thickness of the magnetic recording layer is 0.1–0.6 μm and the ratio of thickness of the buffer layer to that of the magnetic recording layer is 1:1 to 4:1. This coating film makes it possible to realize the excellent medium surface characteristics that could not be obtained with the conventional techniques and to obtain a high recording density excelling those of the conventional in-plane longitudinal recording media.

7 Claims, 1 Drawing Sheet

1 ··· MAGNETIC RECORDING LAYER
2 ··· BUFFER LAYER
3 ··· NON-MAGNETIC BASE FILM
4 ··· BACK COATING LAYER

1 ··· MAGNETIC RECORDING LAYER
2 ··· BUFFER LAYER
3 ··· NON-MAGNETIC BASE FILM
4 ··· BACK COATING LAYER

MAGNETIC RECORDING MEDIUM HAVING A MAGNETIC LAYER CONTAINING HEXAGONAL PLATELET FERRITE PARTICLES AND AN UNERLAYER HAVING A SPECIFIED THICKNESS

This application is a continuation of application Ser. No. 08/145,470, filed Oct. 19, 1993 (abandoned), which is a continuation of application Ser. No. 07/822,915, filed Jan. 21, 1992 (abandoned).

BACKGROUND OF THE INVENTION

1. Field of the Invention

This invention relates to a high-performance magnetic tape which makes it possible to attain an enhancement of recording density in the submicron region, especially to such a magnetic tape which is usable for digital VTR or HD-VTR.

2. Description of the Prior Art

Various signals such as luminance signal, color signal, linear audio signal, FM audio signal and control signal are recorded on a magnetic tape for VTR. In the case of a household VTR, luminance signal, color signal and FM audio signal are superposed on the same track. Luminance signals are relatively short (about 1 μm) in recording wavelength, so that they are recorded in the superficial portion of a magnetic layer. It is well-known that color signals are long in recording wavelength and are recorded deep into the magnetic layer. In the case of the VHS system for household VTR, FM audio signals are recorded by a special wide-gap head and then the picture signal is over-written, so that part of the recorded signal is erased and the remaining portion alone is left the signal.

Hitherto, improvements of electro-magnetic conversion efficiency have been attained by such means as enhancement of Hc, increased degree of packing of magnetic powder particles, ultra-smoothening of magnetic tape surface, adoption of oblique orientation and two-ply formation of the magnetic layer. However, improvement of picture output by enhanced Hc of magnetic tape causes a reduction of output at a low frequency corresponding to the color signal region, and the produced magnetic tape, when viewed synthetically, may prove to be an imbalanced tape. Also, since enhancement of Hc invites an increase of recording current, there arises the problem of interchangeability.

It is also notable that current magnetic recording generally depends on the system which makes use of in-plane magnetization of the recording medium. According to the recording system utilizing such in-plane magnetization, however, any attempt for enhancing recording density is attended by an increase of demagnetizing field in the recording medium, making it difficult to attain enhancement of recording density over a certain level.

For breaking through such limit of recording density, there has recently been proposed the perpendicular magnetic recording system utilizing magnetization perpendicular to a recording medium plane. This perpendicular magnetic recording system has a characteristic that the demagnetizing field in the recording medium is reduced at a high recording density, so that it can be said to be a recording system essentially suited for high-density recording.

Recording medium used for perpendicular magnetic recording includes the type having a continuous film such as a Co—Cr deposited film and the type having a coated film in which the hexagonal platelet barium ferrite particles are dispersed in a resin. Recently, for the reason of practical advantages such as lower cost and higher durability, attention is drawn to the coated film type perpendicular magnetic recording medium, but practical application of this type of recording medium to the devices of a recording and reproducing system using a ring type head is unfavorable because of occurrence of distortion of output waveform. However, in view of the fact that the magnetic powder of barium ferrite suited for high-density recording is composed of the particles which are plate-shaped and ultra-fine, with the plate thickness being of the order of 100–1,000 Å, there is a possibility of realization of a practical coated film type longitudinal magnetic recording medium in which orientation is made longitudinally of the medium.

On the other hand, in order to improve the recording and reproducing characteristics in the short wavelength region, many attempts have been made for minimizing surface roughness of the medium in the range that the practical performance permits, and at the same time efforts have also been actively made for elevating residual flux density of the medium.

In the field of VTR tape technology, there has been developed, and already placed on the market, a VTR tape comprising a multi-ply magnetic layer possessed of luminance, color and audio signal characteristics and capable of developing a high output in the area extending from low frequency to medium to short wavelength region.

However, in the development of the state-of-the-art coated type magnetic recording media, in the case of using magnetic powder of barium ferrite which is expected to provide a further improvement of recording medium performance, there have been noted the defects that it is impossible with the longitudinally oriented magnetic tape to obtain a sufficiently high surface smoothness as compared with the existing magnetic tapes, that the magnetic energy of the tape is far smaller than that of the iron oxide or metal particulate type tapes, and that the erasing characteristics are bad due to the influence of the perpendicular magnetization component. Thus, among the magnetic tapes using barium ferrite, there existed none which had all the characteristics that would eliminate said defects while enabling improvement of the tape performance of said conventional longitudinal recording medium. It is, therefore, impossible with the presently available recording media to obtain as high a short wavelength output as anticipated.

SUMMARY OF THE INVENTION

The present invention, in order to overcome said problems, provides a magnetic tape having a magnetic recording layer composed of magnetic hexagonal platelet ferrite particles on a non-magnetic base film, characterized in that a non-magnetic buffer layer is provided immediately beneath said magnetic recording layer, the thickness of said magnetic recording layer being 0.1–0.6 μm and the ratio of thickness of said buffer layer to that of said magnetic recording layer being 1:1 to 4:1, thus constituting a coating film of a multi-layer structure.

A non-magnetic inorganic pulverized filler such as $\alpha$-FeOOH, $\gamma$-FeOOH, $\alpha$-$Fe_2O_3$ or the like is used for the buffer layer of the magnetic tape according to this invention. The magnetic recording layer preferably has anisotropy in the in-plane longitudinal direction, but this is not an essential requirement. It is also desirable to constitute the laminate structure so that it will have an axis of easy magnetization in the thicknesswise direction of the tape. Owing to said structure, the present invention makes it possible to realize the medium surface characteristics which were unobtainable with the conventional particulate type medium using the magnetic hexagonal platelet ferrite particles, and it is also possible to obtain a high-level recording density which excels that of the conventional in-plane longitudinal recording medium.

These effects can be attributed to the following reason: In the double-layer structured magnetic recording medium using the magnetic hexagonal platelet ferrite particles, said hexagonal platelet ferrite particles are oriented in the longitudinal direction of the medium and also a non-magnetic buffer layer is provided beneath the magnetic recording layer, so that when the layer containing the hexagonal platelet ferrite particles is subjected to surface smoothening treatment, the non-magnetic layer disposed just therebeneath is squashed while serving as a buffer layer, that is, the lower layer functions as an absorbing layer and helps promote smoothening of the upper layer—the magnetic recording layer containing the magnetic hexagonal platelet ferrite particles. The resin binder used in the bufferlayer is preferably the one with low Tg. Under control of the two coating layers, the buffer layer, which is composed of a non-magnetic inorganic pulverized filler, produces the effect of reinforcing the medium as a whole and the effect of absorption that contributes to smoothening of the outermost surface, but it practically takes no part in the recording and reproducing operations. Only the upper layer containing the hexagonal platelet ferrite particles contributes to recording and reproducing performance.

The tape surface characteristics are notably improved by the absorption effect at the interface between said two layers, but there exists an area of strain at the interface. Such an area, however, poses no problem since the layer present immediately beneath the magnetic recording layer is a non-magnetic layer. The attainment of surface smoothening described above makes it possible to realize improvement of short wavelength output over the single-layer tapes of hexagonal-system ferrite, improvement of erasing performance and prevention of deterioration of durability of thinning of the magnetic recording layer, and this makes it possible to supply a magnetic tape of a double-layer structure that can be applied to digital recording.

DESCRIPTION OF THE PREFERRED EMBODIMENTS

The magnetic tape according to the present invention will be further described below with reference to the different embodiments thereof.

EXAMPLE 1

First, a coating composition for forming the buffer layer was prepared by using the following materials:

| | |
|---|---|
| $\alpha$-$Fe_2O_3$ | 100 parts by weight |
| Vinyl chloride resin | 12 parts by weight |
| Polyurethane resin | 10 parts by weight |
| $\alpha$-alumina | 7 parts by weight |
| Stearic acid | 3 parts by weight |
| Carbon black | 1 parts by weight |
| MIBK | 96 parts by weight |

-continued

| | |
|---|---|
| Toluene | 96 parts by weight |
| Cyclohexanone | 48 parts by weight |

The above materials were mixed and then dispersed by a kneader, a mixer and a sandmill for a predetermined period of time.

For $\alpha$-$Fe_2O_3$, the plate-shaped particles having a size of 0.12 μm were used.

For forming the magnetic recording layer, there was prepared a magnetic coating compound of the following composition by using magnetic powder of barium ferrite obtained by a coprecipitation calcining method, with Fe in the component elements being partly substituted with Sn—Mg:

| | |
|---|---|
| Mg—Sn substituted barium ferrite powder (average plate diam.: 0.05 μm; plate ratio (plate diam./plate thickness): 3.5; coercive force: 95 KA/m) | 100 parts by weight |
| Vinyl chloride polymer | 8 parts by weight |
| Polyurethane resin | 8 parts by weight |
| $\alpha$-alumina | 3 parts by weight |
| Solvents | |
| MIBK | 91 parts by weight |
| Toluene | 91 parts by weight |
| Cyclohexanone | 91 parts by weight |

The two coating compositions obtained in the manner described above were coated subsequently on a non-magnetic base film, a 7 μm thick polyethylene-2,6-naphthalate film in the present case by using a duplex die coater, at a coating speed of 100 m/min to form a buffer layer and a magnetic recording layer in that order, and the formed layers were passed through an orientating device evolving a magnetic field in the same direction as movement of the base film to cause orientation in the longitudinal direction of the tape, thereby obtaining a double-layer structured coating film of Example 1.

Figure 1:
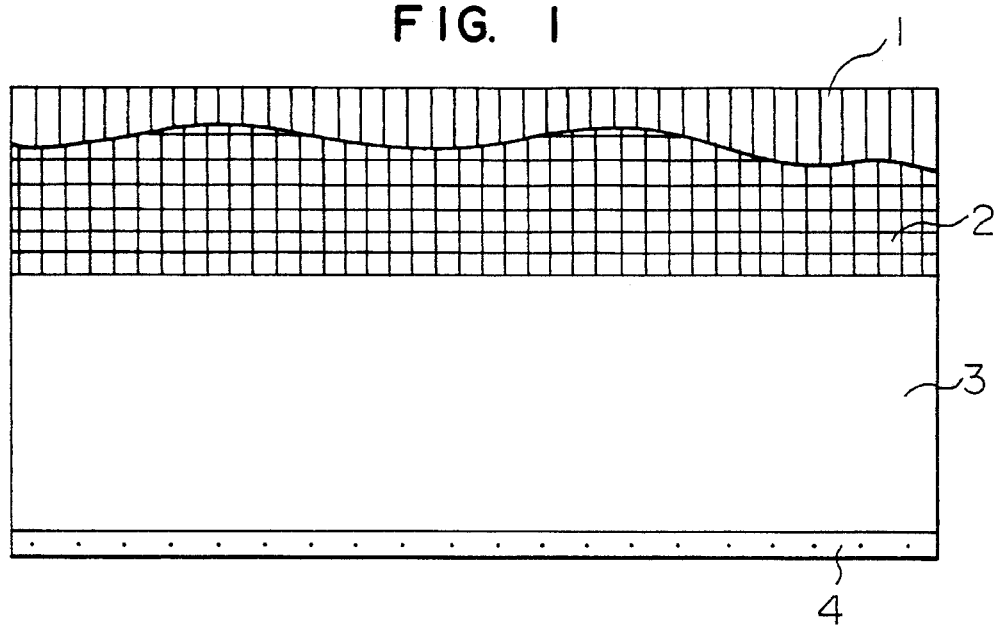
FIG. 1 is a sectional view of the magnetic tape of Example 1 according to the present invention. In the drawing, reference numeral 1 designates magnetic recording layer, 2 buffer layer, 3 non-magnetic base film and 4 back coating layer.
Figure 2:
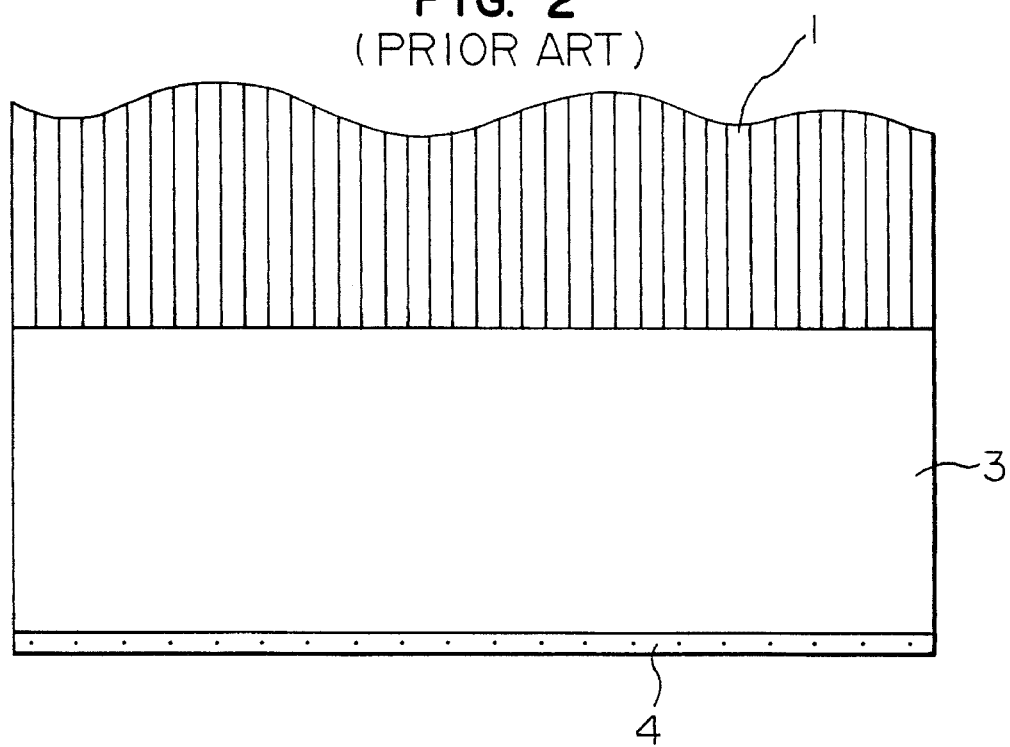
FIG. 2 is a sectional view of a conventional magnetic tape.

FIG. 1 shows a sectional view of the magnetic tape in an embodiment of the present invention. In the figure, reference numeral 1 designates magnetic recording layer, 2 buffer layer, 3 non-magnetic base film (polyethylene terephthalate film, polyethylene-2,6-naphthalate film or the like) and 4 back coating layer.

In Example 1, the buffer layer had a thickness of 1.8 μm and the magnetic recording layer 0.6 μm. If the thickness of the magnetic recording layer is less than 0.1 μm, it becomes difficult to obtain a film structure with uniform thickness and to secure good tape surface roughness, contact with the magnetic head during recording and reproducing becomes bad and further practically satisfactory recording and reproducing may not be done. On the other hand, if the thickness of the magnetic recording layer exceeds 0.6 μm, it no longer serves as an absorbing layer for the buffer layer and rather the medium surface roughness are impaired. For these reason, the thickness of the magnetic recording layer was set to be 0.1–0.6 μm in the present invention. It is to be noted that it was impossible with the process of this invention to realize a tape in which the thickness of the magnetic recording layer was less than 0.1 μm.

EXAMPLE 2

A double-layer type magnetic tape was made according to Example 1 by following the same coating composition preparation format except that $\alpha$-FeOOH with acicular ratio of 20 was employed as the inorganic pulverized filler used for forming the buffer layer while using the same magnetic powder as employed in Example 1 for forming the magnetic recording layer. In this example, the buffer layer was made to have a thickness of 1.2 μm and the magnetic recording layer 0.3 μm to obtain the coating film of Example 2.

EXAMPLE 3

The buffer layer was formed by applying the same coating composition as used in Example 1 under the same conditions as in Example 1, immediately followed by coating thereon of the magnetic recording layer-forming coating composition of Example 1 whose solids concentration had been reduced by 5%, thereby preparing a similar coating film as a coating film of Example 3.

EXAMPLE 4

A coating composition for forming the buffer layer, prepared according to Example 1 except for use of goethite (γ-FeOOH; acicular ratio: 20) as the non-magnetic inorganic powder, was first coated on a non-magnetic base to form the buffer layer, followed by formation thereon of the magnetic recording layer according to Example 1 to thereby make the double-layer type magnetic recording medium of Example 4.

EXAMPLE 5

A double-layer magnetic recording medium was made by following the same procedure as Example 1 except that, in forming the buffer layer, there was used the coating composition of Example 1 whose solids concentration had been reduced by 10%.

COMPARATIVE EXAMPLE 1

The same coating composition as employed in Example 1 but changed in solids concentration was used for forming the buffer layer while barium ferrite same as employed in Example 1, was used as magnetic powder for forming the magnetic recording layer. For preparing the coating compositions, the materials were mixed and dispersed according to Example 1 by using a kneader and a grinding mill and adding predetermined amounts of a lubricant and a curing agent with stirring. Said two coating compositions were coated on the surface of a base film by using a duplex die coater at a coating speed of approximately 100 m/min, then passed through a space in an orientating magnet having a magnetic flux in the same direction as movement of the base film, then dried and cured to obtain a coating film of Comparative Example 1.

COMPARATIVE EXAMPLE 2

For forming the buffer layer, there was used the same coating composition as employed in Example 1 except that the polyurethane resin used was the one having Tg of 50° C. and that the solids concentration was increased by 10%. For forming the magnetic recording layer, the procedure of Example 1 was followed except for use of barium ferrite substituted Co—Zn—Ti. The coating compositions were prepared according to the procedure of Example 1 by mixing and dispersing the materials by using a kneader and a grinding mill to form a magnetic coating composition and adding thereto with stirring predetermined amounts of a lubricant and a curing agent. These coating compositions were coated on a base film by using a duplex die coater at a coating speed of about 100 m/min, then passed through a space in an aorentating magnet issuing a flux in the same direction as movement of the base film, then dried and cured to obtain the coating film of Comparative Example 2.

COMPARATIVE EXAMPLE 3

The buffer and magnetic recording layers were formed by following the procedure of Example 1 except for use of red iron oxide (α-Fe$_2$O$_3$) in forming the buffer layer and use of magnetic powder of barium ferrite employed in Example 3 in forming the magnetic recording layer. The coating compositions were prepared according to Example 1 by mixing and dispersing the materials by using a kneader and a grinding mill and adding with stirring predetermined amounts of a lubricant and a curing agent. The coating compositions were coated on the surface of a base film by using a duplex die coater at a coating speed of approximately 150 m/min and subjected to magnetic field orientation by passing the coats through magnetic pole of solenoid evolving a magnetic flux in the same direction as movement of the base film to prepare a magnetic coating film as a coating film of Comparative Example 3.

COMPARATIVE EXAMPLE 4

The coating composition for magnetic recording layer used in Example 1 was coated singly, without forming a buffer layer, on a base film to a coating thickness of 0.5 μm, and for effecting magnetic field orientation, the coating was passed through a solenoid magnet evolving a magnetic flux in the same direction as movement of the film to make a magnetic coating film the coating film of Comparative Example 4.

COMPARATIVE EXAMPLE 5

The coating composition for magnetic recording layer used in Example 1 was coated singly, without forming a buffer layer, on a base film to a coating thickness of 2.5 μm, and for effecting magnetic field orientation, the coating was passed through a solenoid magnet evolving a magnetic flux in the same direction as movement of the film to make a magnetic coating film (the coating film of Comparative Example 5).

Each of the obtained coating films was slit to a width of ½ inch and its recording performance was determined by using a remodeled VHS deck. A laminated amorphous head having a gap length of 0.21 μm and a track width of 10 μm was mounted on the deck and the value of output at a tape/head relative velocity of 5.8 m/sec and a recording frequency of 7 MHz was measured to thereby evaluate the recording performance. For evaluating the erasing performance, a signal of 1 kHz was recorded on a tape and the output value after erasure of the signal by the erasing head was determined and expressed as a relative value to Comparative Example 5. The obtained tape sample was evaluated by using a non-contact surface roughness tester (mfd. by WYKO Co.). Tape durability was evaluated by visual appearance and change of output after continuous 100-pass (12 hours per pass) run under the conditions of 40° C. and 80% RH. The results of determinations are shown in Table 1. RF output was shown by the relative values to Comparative Example 5 which was referred to as 0 dB.

In Examples 1–5 where the magnetic recording layer was formed from a double-layer structure disclosed in the present invention, it was possible to realize both improvement of surface roughness of the medium and securing of high durability. As a result, as shown in Table 1, a high output was provided at the frequency of measurement and also high durability could be secured by the effect of double-layer structure disclosed in the present invention.

In Comparative Examples, it was impossible to obtain satisfactory characteristics and performance with a conventional hexagonal-system ferrite tape of a single-layer structure. Nor was it possible to secure satisfactory durability with a thin layer type single-layer tape. In Comparative Examples 1–3, the effect of use of a buffer layer could not be brought out in full.

When the thickness of the magnetic recording layer is made less than 0.1 μm, surface roughness of the buffer layer is reflected on the final tape surface characteristics, causing a rise of tape noise during run of the tape. On the other hand, when the thickness of the magnetic recording layer becomes greater than 0.6 μm, there is no longer exhibited the surface characteristic improving effect provided by the double-layer structure.

As seen from the foregoing results, in the Examples of this invention, it is possible to attain both enhancement of output in the short wavelength region and stabilized durability at a high level, which is impossible with the samples of the Comparative Examples.

Regarding the orientation mode, although no restriction is imposed on such mode in the present invention, it is desirable to provide anisotropy in the in-plane longitudinal direction, more preferably in the direction of thickness of the medium. As for the buffer layer, it is possible to obtain the same effect as described in the Examples even when using other materials than $\alpha$-$Fe_2O_3$ and FeOOH, such as boron nitride, zinc oxide, kaolin, mica, silicon carbide and the like. Concerning the overall tape thickness, discussions were made by choosing a value of 13 μm in consideration of possible longer recording time in future in various uses of ½ inch tape, but this is in no way intended to be restrictive and it should be understood that the invention can be applied to all sizes of tape, such as 8 mm and 3.8 mm tapes.

a magnetic recording layer, formed on said non-magnetic buffer layer, containing magnetic hexagonal platelet ferrite particles having a diameter of 0.1 μm or less;

wherein said non-magnetic buffer layer is provided between said magnetic recording layer and said non-magnetic base film, said magnetic recording layer has a thickness in a range of 0.1– 0.6 μm, said non-magnetic buffer layer is composed of at least one of the materials selected from the group consisting of $\alpha$-$Fe_2O_3$, $\alpha$-FeOOH and $\gamma$-FeOOH, and the ratio of thickness of said non-magnetic buffer layer to said thickness of said magnetic recording layer is in a range of 3:1 to 4:1.

2. A magnetic tape according to claim 1, wherein said magnetic hexagonal platelet ferrite particles have an M or W structure.

3. A magnetic tape according to claim 1, wherein the buffer layer comprises $\alpha$-$Fe_2O_3$ particles and has a thickness in the range from 0.4 to 2.4 μm.

4. A magnetic tape according to claim 3, wherein the buffer layer has a thickness in the range from 0.4 to 1.8 μm.

5. A magnetic tape according to claim 3, wherein the buffer layer has a thickness in the range from 1.8 to 2.4 μm.

6. A magnetic tape according to claim 5, wherein the recording layer has a thickness in the range from 0.3 to 0.6 μm.

TABLE 1

| | COATING FILM | | | | TAPE DURABILITY | |
|---|---|---|---|---|---|---|
| | STRUCTURE MAGNETIC/BUFFER RECORDING/LAYER LAYER (μm)/(μm)/RATIO | SURFACE ROUGH-NESS (nm) | RF OUTPUT AT 7 MHz (dB) | ERASING PERFORM-ANCE (dB) | VISUAL APPEAR-ANCE OF TAPE* | VARIA-TION OF OUTPUT (dB) |
| Example 1 | 0.6/1.8/3.0 | 5.8 | +2.1 | −5.0 | ⊚ | +0.1 |
| Example 2 | 0.3/1.2/4.0 | 4.6 | +3.0 | −5.4 | o | +0.2 |
| Example 3 | 0.3/1.2/4.0 | 5.5 | +2.6 | −5.5 | ⊚ | −0.1 |
| Example 4 | 0.6/2.4/4.0 | 6.1 | +1.9 | −4.8 | ⊚ | ±0 |
| Example 5 | 0.1/0.4/4.0 | 5.3 | +2.5 | −6.0 | o | +0.1 |
| Comp. Example 1 | 0.6/0.5/0.83 | 9.4 | +0.1 | −2.0 | x | −1.4 |
| Comp. Example 2 | 0.6/3.0/5.0 | 9.7 | −0.1 | −1.5 | Δ | −1.9 |
| Comp. Example 3 | 1.0/0.8/0.8 | 9.2 | +0.3 | −3.0 | x | −2.4 |
| Comp. Example 4 | 0.5/—/— | 8.3 | −0.5 | −5.0 | x | −4.0 |
| Comp. Example 5 | 2.5/—/— | 10.1 | ±0 | ±0 | Δ | +0.1 |

*) ⊚: Substantially no abrasion or damage of the tape was observed.
o: Only slight abrasion or damage of the tape was observed.
Δ: A little abrasion and damage of the tape were observed.
x: Considerable abrasion and damage of the tape were observed.

What is claimed is:

1. A magnetic tape comprising:
   a non-magnetic base film;
   a non-magnetic buffer layer formed on said non-magnetic base film; and 7. A magnetic tape according to claim 1, wherein the platelet ferrite particles have an average plate size of 0.05 microns.

* * * * *